(12) United States Patent
Hapsari et al.

(10) Patent No.: US 11,647,381 B2
(45) Date of Patent: May 9, 2023

(54) RADIO COMMUNICATION SYSTEM, NETWORK DEVICE, USER DEVICE, RADIO BASE STATION AND RADIO COMMUNICATION METHOD

(71) Applicant: NTT DOCOMO, INC., Tokyo (JP)

(72) Inventors: Wuri Andarmawanti Hapsari, Tokyo (JP); Hideaki Takahashi, Tokyo (JP); Anil Umesh, Tokyo (JP); Kenji Kai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 68 days.

(21) Appl. No.: 16/637,580

(22) PCT Filed: Aug. 8, 2018

(86) PCT No.: PCT/JP2018/029742
§ 371 (c)(1),
(2) Date: Feb. 7, 2020

(87) PCT Pub. No.: WO2019/031540
PCT Pub. Date: Feb. 14, 2019

(65) Prior Publication Data
US 2020/0260264 A1 Aug. 13, 2020

(30) Foreign Application Priority Data
Aug. 10, 2017 (JP) .............................. JP2017-155811

(51) Int. Cl.
*H04W 8/24* (2009.01)
*H04W 76/11* (2018.01)
(Continued)

(52) U.S. Cl.
CPC .............. *H04W 8/24* (2013.01); *H04W 76/11* (2018.02); *H04W 76/27* (2018.02); *H04W 88/06* (2013.01)

(58) Field of Classification Search
CPC ....... H04W 8/24; H04W 76/11; H04W 76/27; H04W 88/06
(Continued)

(56) References Cited

U.S. PATENT DOCUMENTS 11,356,949 B2 * 6/2022 Xu ..................... H04W 52/0229
2012/0208571 A1 * 8/2012 Park ..................... H04L 67/101
455/466

(Continued)

FOREIGN PATENT DOCUMENTS

JP 2017123582 A 7/2017
WO 2017/078580 A1 5/2017

OTHER PUBLICATIONS

Extended European Search Report in counterpart European Application No. 18844358.4 dated Mar. 23, 2021 (15 pages).
(Continued)

*Primary Examiner* — Congvan Tran
(74) *Attorney, Agent, or Firm* — Osha Bergman Watanabe & Burton LLP

(57) ABSTRACT

CN (200) acquires from UE (50) UE Capability ID of UE Capability that indicates capability of the UE (50), and manages the UE Capability and the UE Capability ID by associating them with each other. The CN (200) transmits to gNB (100) Initial Context Setup Request as an instruction to acquire the UE Capability based on the acquired UE Capability ID and the UE Capability managed by the CN (200).

9 Claims, 11 Drawing Sheets

(51) Int. Cl.
*H04W 76/27* (2018.01)
*H04W 88/06* (2009.01)

(58) Field of Classification Search
USPC .................................................. 370/328, 329
See application file for complete search history.

(56) References Cited

U.S. PATENT DOCUMENTS

| | | | |
|---|---|---|---|
| 2014/0098756 A1 | 4/2014 | Tabatabaei Yazdi et al. | |
| 2014/0155056 A1* | 6/2014 | Jactat | H04W 24/08 455/422.1 |
| 2015/0208456 A1* | 7/2015 | Guo | H04W 76/14 455/426.1 |
| 2016/0095108 A1* | 3/2016 | Ryoo | H04W 72/0426 370/329 |
| 2017/0215065 A1* | 7/2017 | Vamanan | H04W 76/10 |
| 2018/0317218 A1* | 11/2018 | Li | H04W 72/1268 |
| 2020/0169831 A1* | 5/2020 | Li | H04W 4/20 |
| 2020/0245131 A1* | 7/2020 | Vandervelde | H04W 76/10 |
| 2021/0058748 A1* | 2/2021 | Liao | H04W 76/11 |
| 2021/0212124 A1* | 7/2021 | Wakabayashi | H04W 74/0833 |
| 2021/0307003 A1* | 9/2021 | Chou | H04W 72/0413 |

OTHER PUBLICATIONS

Qualcomm Incorporated; "Reducing the size of UE capabilities"; 3GPP TSG-RAN WG2 meeting NR adhoc #2, R2-1707142; Qingdao, China; Jun. 27-29, 2017 (2 pages).
3GPP TSG-RAN WG2 Meeting #49; R2-052889; "A signalling optimisation from Idle to Active" NTT DoCoMo, Inc. Seoul, Korea; Nov. 7-11, 2005 (2 pages).
3GPP TSG-RAN WG2 NR Ad Hoc; R2-1707210; "NR UE capabilities, size reduction and simplification" Samsung Qingdao, China; Jun. 27-29, 2017 (5 pages).
International Search Report issued in International Application No. PCT/JP2018/029742, dated Oct. 23, 2018 (4 pages).
Written Opinion issued in International Application No. PCT/JP2018/029742; dated Oct. 23, 2018 (5 pages).
Office Action issued in counterpart Chinese Patent Application No. 201880064473.4 dated Oct. 10, 2022 (15 pages).
Office Action issued in the counterpart Japanese Patent Application No. 2019-535698, dated May 24, 2022 (7 pages).
Office Action issued in the counterpart Chinese Patent Application No. 201880064473.4, dated May 24, 2022 (17 pages).

* cited by examiner

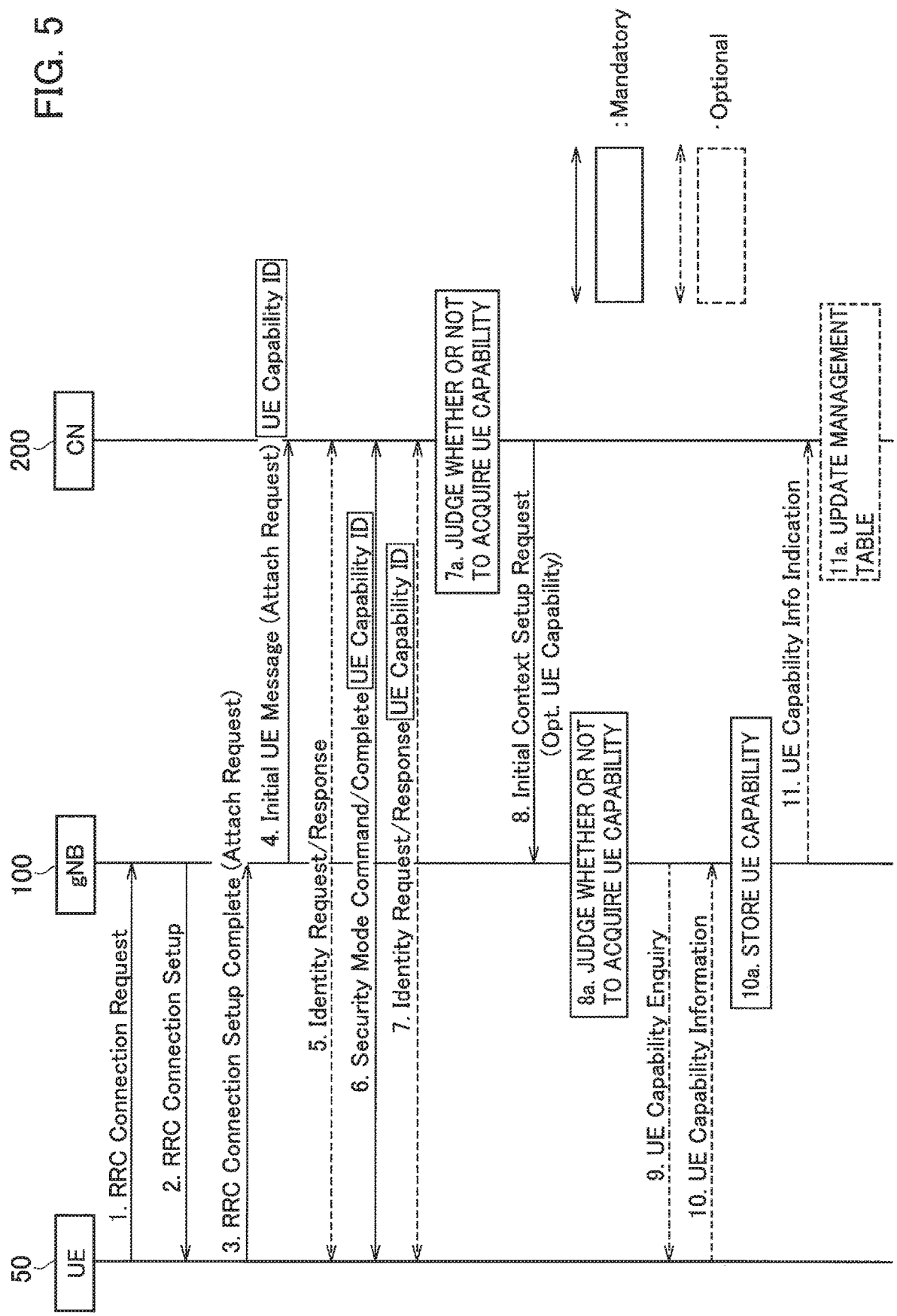

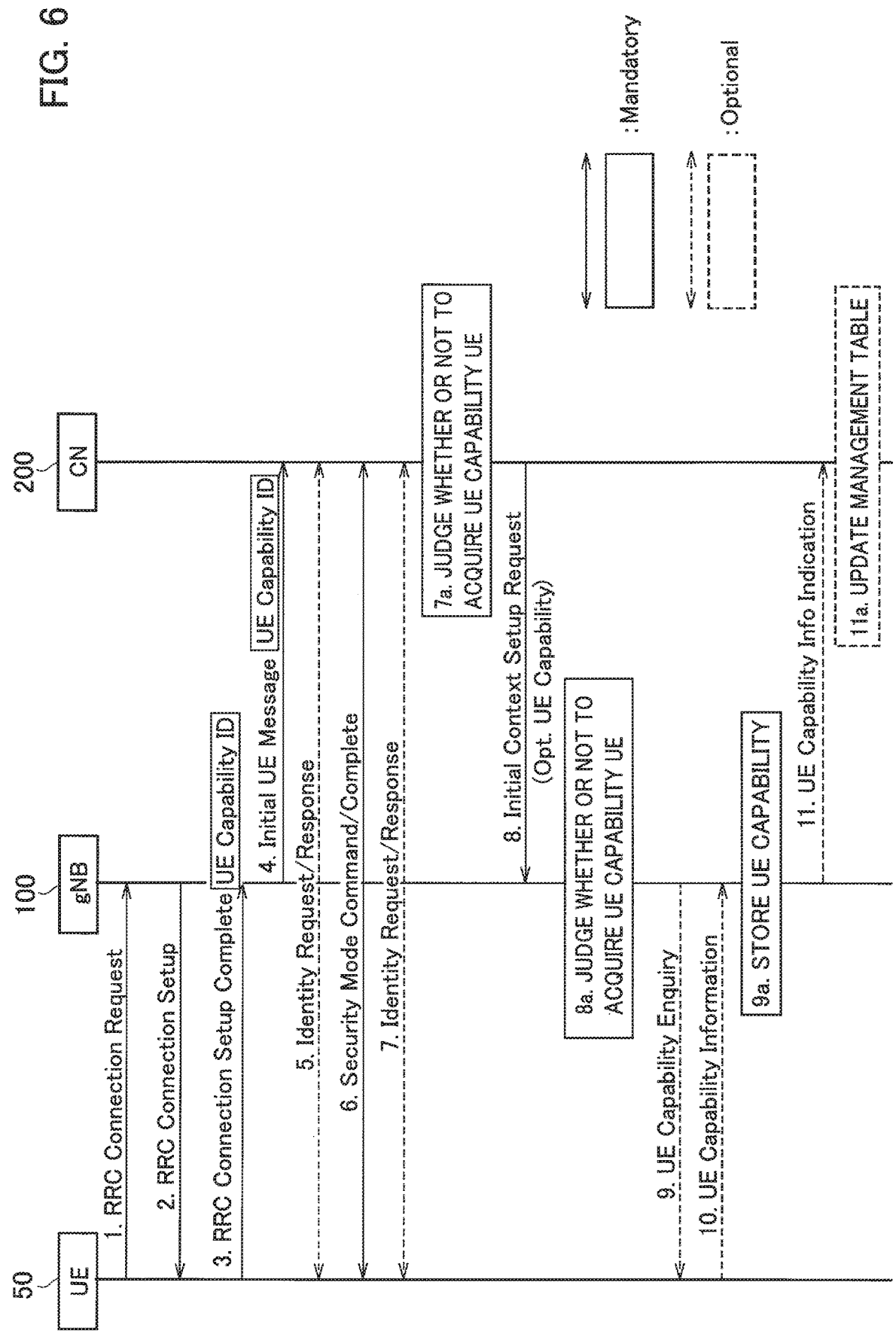

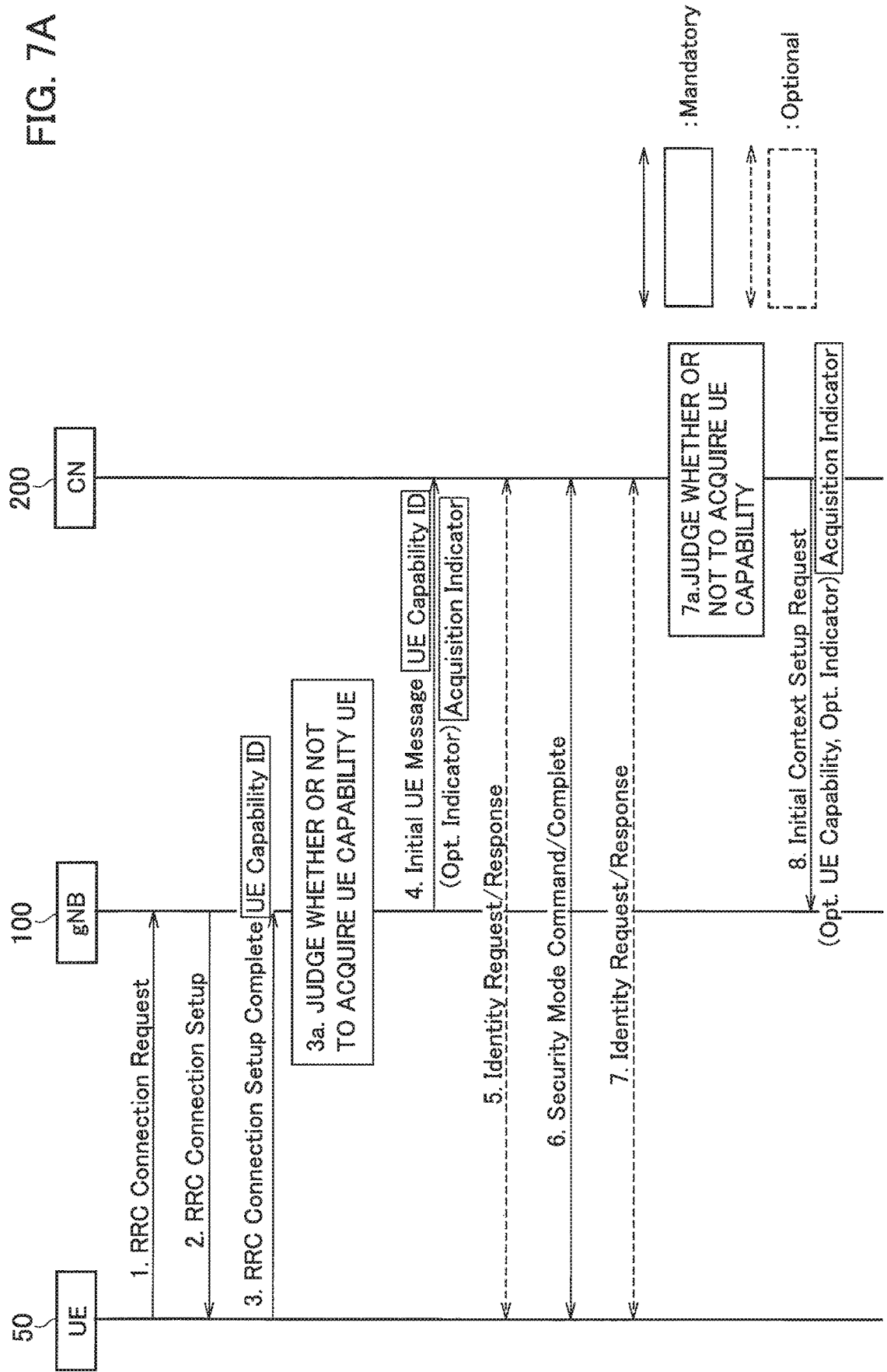

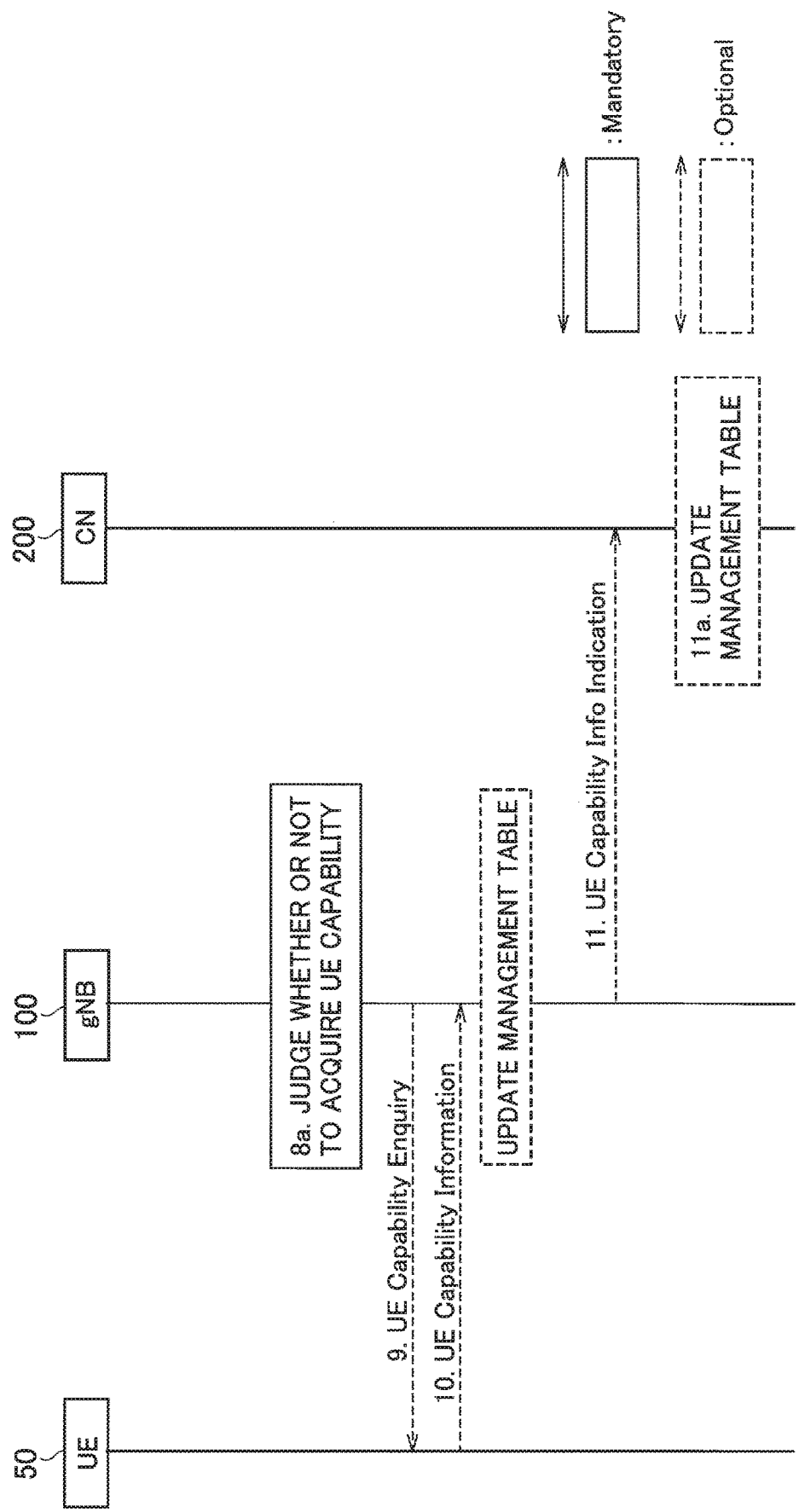

FIG. 8

| ID | UE Capability |
|---|---|
| A | UE Capability content···a, b |
| B | UE Capability content···x, y |
| C | UE Capability content···n, m |
| ⋮ | ⋮ |

TB

- UE Category
- CA/DC band combinations
- MIMO layers
- PWS capability
- etc.

FIG. 9

| PATTERN | UE Capability RETAINING STATE | | IE SETTING LOGIC (Opt.) | |
|---|---|---|---|---|
| | gNB | CN | UECapability | Acquisition Indicator |
| 1 | RETAINING | RETAINING | No | Yes |
| 2 | RETAINING | NOT-RETAINING | No | No |
| 3 | NOT-RETAINING | RETAINING | Yes | Yes |
| 4 | NOT-RETAINING | NOT-RETAINING | No | No |

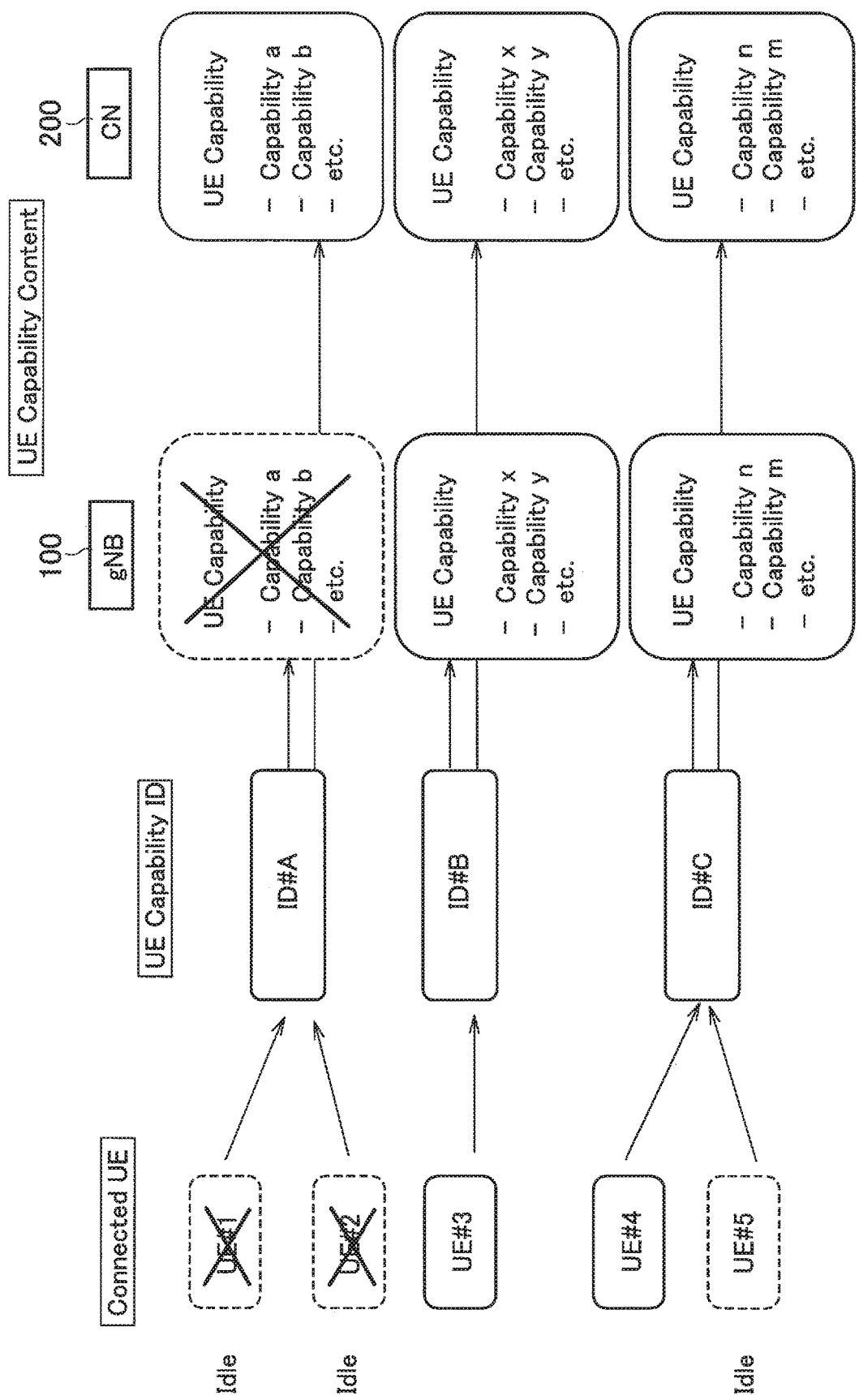

RADIO COMMUNICATION SYSTEM, NETWORK DEVICE, USER DEVICE, RADIO BASE STATION AND RADIO COMMUNICATION METHOD

TECHNICAL FIELD

The present invention relates to a radio communication system, a network device, a user device, a radio base station and a radio communication method capable of handling UE Capability.

BACKGROUND ART

3rd Generation Partnership Project (3GPP) specifies Long Term Evolution (LTE), and with an aim of further speeding, specifies LTE-Advanced (hereinbelow, the LTE includes the LTE-Advanced). Moreover, in the 3GPP, specifications of a successor system of the LTE called 5G New Radio (NR) and the like are being studied.

In LTE, to realize various controls of a user device (User Equipment, UE), a radio base station (eNB) and a mobility management entity (MME) acquire the UE Capability (capability information) that indicates the capability supported by UE. Specifically, each time the UE is attached to the MME, the MME acquires the UE Capability transmitted from the UE and retains it as a UE Context. Moreover, when an idle UE becomes active, the MME notifies the eNB, that forms a cell to which the UE belongs, of the UE Capability of the retained UE.

Even though the UE Capability of each UE is not necessarily different from that of others, the MME duplicates a same UE Capability every time in order to retain an independent UE Capability for each UE Context. Moreover, in the present 3GPP standard specifications, because the eNB and the MME retain a plurality of duplicate UE Capabilities having mutually same contents, wastage of the memory resources of the eNB and MME has been pointed out in addition to an increase in the amount of data signals attributable to the notifications of the UE Capabilities.

Therefore, it is proposed that identifiers that can uniquely identify the respective UE Capabilities having mutually same contents be defined and used to acquire and manage UE Capabilities (for example, see Non-Patent Document 1).

PRIOR ART DOCUMENT

Non-Patent Document

Non-Patent Document 1: "NR UE capabilities, size reduction and simplification", R2-1707210, 3GPP TSG-RAN WG2 NR Ad Hoc, 3GPP, June 2017

SUMMARY OF THE INVENTION

In the case of using an identifier as proposed in the Non-Patent Document 1 mentioned above, the sequence of acquisition and notification of the existing UE Capability must be modified. Therefore, determination of the timing at which the UE Capability can be efficiently acquired and a CN (core network) can be notified of the UE Capability becomes a problem.

The present invention has been made in view of the above circumstances. One object of the present invention is to provide a radio communication system, a network device, a user device, a radio base station and a radio communication method capable of efficiently acquiring the UE Capability and notifying the CN of the UE Capability, when an identifier of UE Capability is used to acquire the UE Capability and notify the CN of the UE Capability.

A radio communication system according to one aspect of the present invention is a radio communication system (radio communication system 10) that includes a network device (CN 200), a radio base station (gNB 100), and a user device (UE 50). The network device includes an identifier acquiring unit (identifier acquiring unit 210) that acquires from the user device an identifier (UE Capability ID) of capability information (UE Capability) that indicates a capability of the user device; a capability information managing unit (capability information managing unit 220) that manages the capability information and the identifier by associating them with each other; and an acquisition instruction transmitting unit 240 that transmits, based on the identifier acquired by the identifier acquiring unit and the capability information managed by the capability information managing unit, to the radio base station an instruction (Opt. UE Capability of Initial Context SetupRequest) to acquire the capability information. The radio base station includes an acquisition instruction receiving unit (acquisition instruction receiving unit 120) that receives the acquisition instruction; a capability information enquiring unit (capability information enquiring unit 130) that transmits, based on the acquisition instruction, to the user device an enquiry for the capability information; and a capability information transmitting unit (capability information transmitting unit 140) that transmits to the network device the capability information received from the user device. The user device includes an identifier transmitting unit (identifier transmitting unit 53) that transmits the identifier; an enquiry receiving unit (enquiry receiving unit 55) that receives the enquiry; and a capability information transmitting unit (capability information transmitting unit 140) that transmits to the radio base station the capability information based on the enquiry.

According to another aspect of the present invention, a network device includes an identifier acquiring unit that acquires from a user device an identifier of capability information that indicates a capability of the user device; a capability information managing unit that manages the capability information and the identifier by associating them with each other; and an acquisition instruction transmitting unit that transmits, based on the identifier acquired by the identifier acquiring unit and the capability information managed by the capability information managing unit, to a radio base station an instruction to acquire the capability information.

According to still another aspect of the present invention, a user device includes an identifier transmitting unit that transmits towards a network device an identifier of capability information that indicates a capability of the user device; an enquiry receiving unit that receives an enquiry about the capability information transmitted from the network device based on a status of the association between the identifier and the capability information; and a capability information transmitting unit that transmits to a radio base station the capability information based on the enquiry.

According to still another aspect of the present invention, a radio base station includes an acquisition instruction receiving unit that receives an instruction to acquire capability information that indicates a capability of a user device; a capability information enquiring unit that transmits to the user device an enquiry for the capability information, based on the acquisition instruction; and a capability information transmitting unit that transmits to a network device the capability information received from the user device.

According to still another aspect of the present invention, a radio communication method includes transmitting in which a user device transmits towards a network device an identifier of capability information that indicates a capability of the user device; acquiring in which the network device acquires the identifier from the user device; transmitting in which the network device transmits, based on the acquired identifier and the capability information managed by the network device, to a radio base station an instruction to acquire the capability information; receiving in which the radio base station receives the acquisition instruction; transmitting in which the radio base station transmits an enquiry about the capability information, based on the acquisition instruction; receiving in which the user device receives the enquiry; transmitting in which the user device transmits to the radio base station the capability information, based on the enquiry; and transmitting in which the radio base station transmits to the network device the capability information received from the user device.

BRIEF DESCRIPTION OF DRAWINGS

FIG. 5 is a diagram showing an acquisition sequence of a UE Capability ID and an update sequence of a management table TB (operation example 1).

FIG. 6 is a diagram showing the acquisition sequence of the UE Capability ID and the update sequence of the management table TB (operation example 2).

FIG. 7A is a diagram showing the acquisition sequence of the UE Capability ID and the update sequence of the management table TB (operation example 3).

FIG. 7B is a diagram showing the acquisition sequence of the UE Capability ID and the update sequence of the management table TB (operation example 3).

FIG. 8 is a diagram showing an example of the management table.

FIG. 9 is a diagram showing a setting logic of an information element (IE) that is included in an Initial Context Setup Request.

FIG. 10B is a diagram showing another example of the method of managing the UE Capability.

MODES FOR CARRYING OUT THE INVENTION

Figure 1:
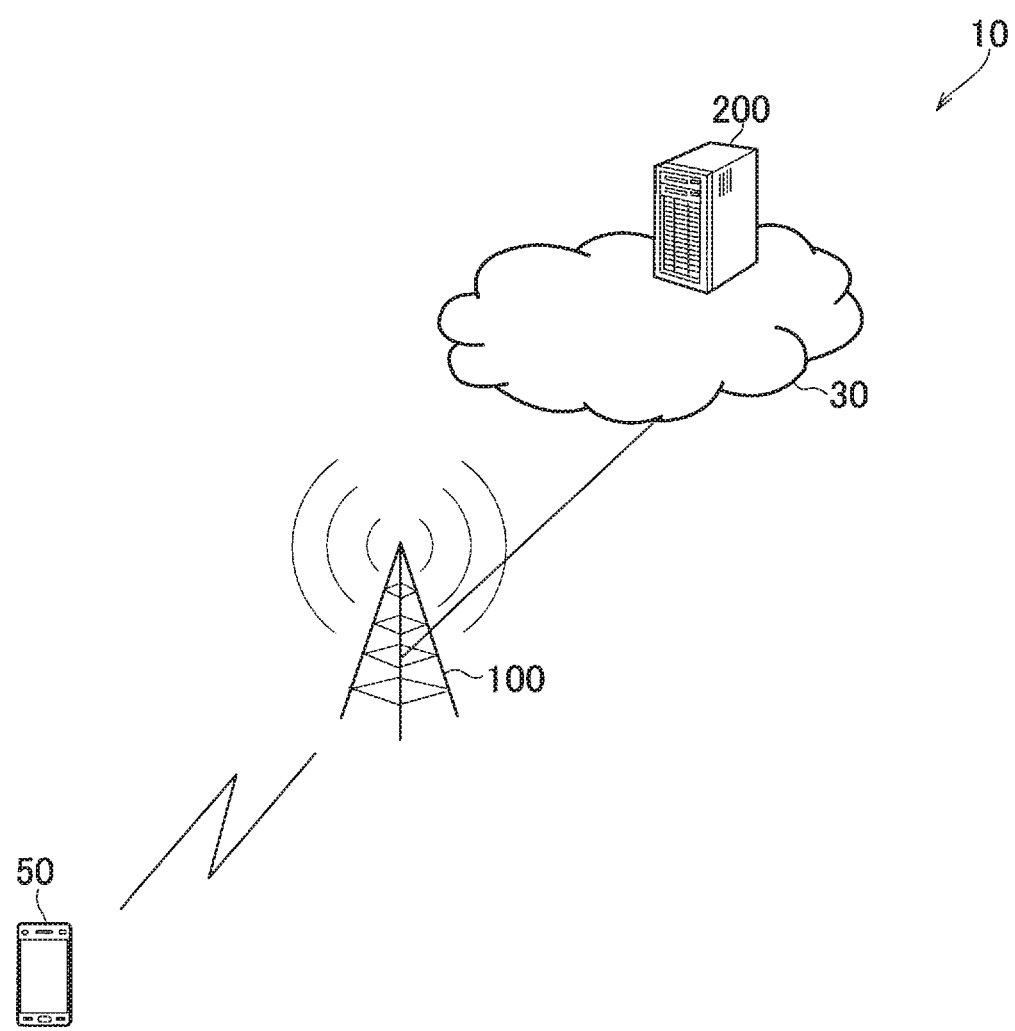
FIG. 1 is an overall structural diagram of a radio communication system 10.

Exemplary embodiments of the present invention are explained below with reference to the accompanying drawings. Furthermore, in the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system using 5G New Radio (NR) and includes a user device 50 (hereinafter, UE 50), a radio base station 100 (hereinafter, gNB 100) and a core network node 200 (hereinafter, CN 200).

However, the radio communication system 10 is not necessarily limited to the radio communication system using the NR. For example, the radio communication system 10 can be a radio communication system using an LTE (E-UTRAN).

The UE 50 and the gNB 100 perform radio communication using NR. Particularly, in the present embodiment, the UE 50 transmits towards the gNB 100 and the CN 200, the UE Capability (capability information) that indicates the capabilities supported by the UE 50, and also a UE Capability ID (identifier) that uniquely identifies the UE Capability.

The CN 200 is a network device that constitutes a core network 30, and provides mobility management function, and the like of the UE 50. Particularly, in the present embodiment, the CN 200 manages the association of a plurality of UE Capabilities with the UE Capability IDs.

As a concrete example of the CN 200, the example of Access and Mobility Management Function (AMF) is cited. But the function of CN 200 can be included in the other network devices, without being limited to AMF.

(2) Functional Block Configuration of Radio Communication System

A functional block configuration of the radio communication system 10 is explained below. Specifically, functional block configurations of the UE 50, the gNB 100 and the CN 200 are explained below. For convenience, the following explanation is given in the order of the CN 200, the gNB 100, and the UE 50.

(2.1) CN 200

Figure 2:
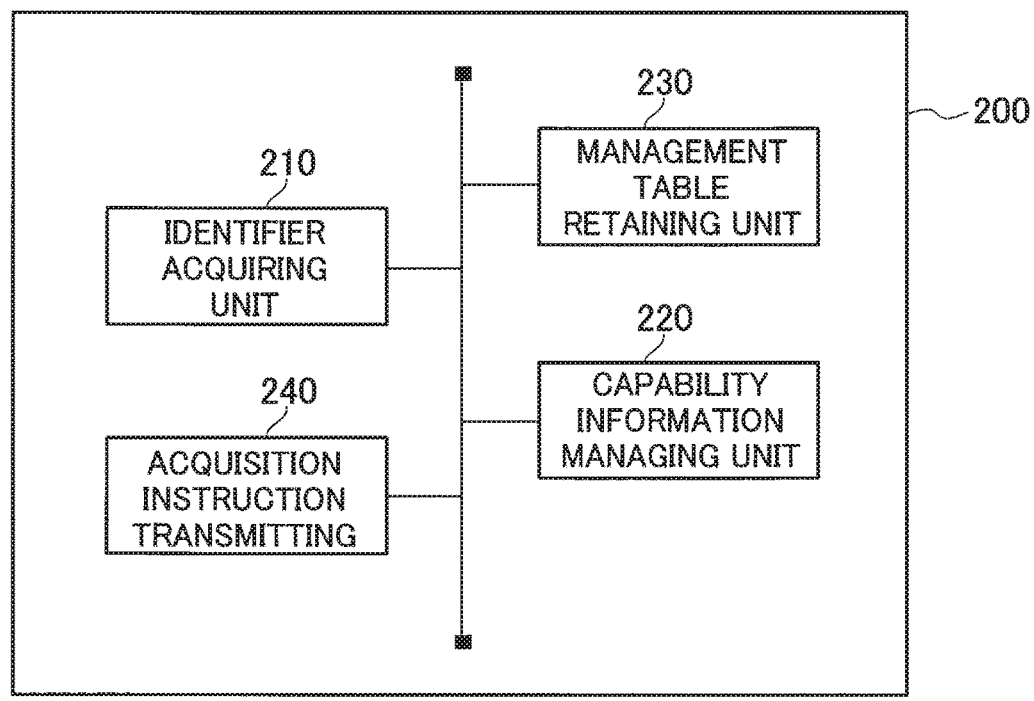
FIG. 2 is a functional block diagram of CN 200.

FIG. 2 is a functional block diagram of the CN 200. As shown in FIG. 2, the CN 200 includes an identifier acquiring unit 210, a capability information managing unit 220, a management table retaining unit 230, and an acquisition instruction transmitting unit 240.

The identifier acquiring unit 210 acquires from the UE 50 the identifier of the UE Capability that indicates the capability of the UE 50. Specifically, the identifier acquiring unit 210 acquires the UE Capability IDs that uniquely identify the respective UE Capabilities having mutually same contents.

Furthermore, the method of assigning the UE Capability ID is not limited to any particular method. However, as explained, for example, in the prior art document (3GPP R2-1707210), the result obtained by inputting the content of the UE Capability into the hash function can be used as the UE Capability ID.

The gNB 100 and the CN 200 use the UE Capability to perform various controls of the UE 50. The UE Capability includes a UE Category, CA (Carrier Aggregation)/DC (Dual Connectivity) band combinations, MIMO layers, a PWS (Public Warning System) capability, and the like.

The identifier acquiring unit 210 can acquire the UE Capability ID transmitted from the UE 50, by using the message of Non-Access Stratum (NAS) between the UE 50 and the core network 30, more specifically, the CN 200.

For example, the identifier acquiring unit 210 can acquire the UE Capability ID that is included in the Attach Request. Moreover, the identifier acquiring unit 210 can, without limiting to an Attach Request, request for identifier acquisition by issuing a Security Mode Command or an Identity Request to get a Security Mode Complete or Identity Response message that includes the UE Capability ID.

Moreover, the identifier acquiring unit 210 can, by using the message of Access Stratum between the UE 50 and the gNB 100, acquire the UE Capability ID transmitted from the UE 50. Specifically, the identifier acquiring unit 210 acquires the UE Capability ID included in the Initial UE Message transmitted from the gNB 100 to the CN 200, in accordance with RRC Connection Setup Complete transmitted by the UE 50 to the gNB 100.

The capability information managing unit 220 manages the UE Capabilities and the UE Capability IDs by associating them with each other. Specifically, the capability information managing unit 220 registers new and updates the existing associations in the management table retained by the management table retaining unit 230.

FIG. 8 shows an example of the management table. As shown in FIG. 8, the management table TB is constituted by the UE Capability IDs (the "ID" shown in the figure) associated with the respective UE Capabilities. As explained above, the UE Capability includes UE Category and the like, whereas the UE Capability ID can uniquely identify the contents of the UE Capability.

The management table retaining unit 230 retains the management table TB, which contains the UE Capability IDs and the UE Capabilities associated with them. Specifically, the management table retaining unit 230 modifies the contents of the management table TB, based on an instruction from the capability information managing unit 220.

The acquisition instruction transmitting unit 240 transmits to the gNB 100 an instruction to acquire the UE Capability. Specifically, based on the UE Capability ID acquired by the identifier acquiring unit 210 and the UE Capability managed by the capability information managing unit 220, the acquisition instruction transmitting unit 240 transmits to the gNB 100, the instruction to acquire the UE Capability.

More specifically, the acquisition instruction transmitting unit 240 transmits such acquisition instruction when the UE Capability associated with the UE Capability ID acquired by the identifier acquiring unit 210 is not retained in the management table TB.

In the present embodiment, the acquisition instruction transmitting unit 240 transmits the acquisition instruction by using an information element (IE) of the UE Capability that is included in the Initial Context Setup Request.

Specifically, if the UE Capability ID acquired by the identifier acquiring unit 210 is registered in the management table TB, the acquisition instruction transmitting unit 240 transmits the Initial Context Setup Request that includes the UE Capability associated with that ID. On the other hand, if the UE Capability ID acquired by the identifier acquiring unit 210 is not registered in the management table TB, the acquisition instruction transmitting unit 240 does not include the respective UE Capability in the Initial Context Setup Request. Accordingly, it is possible to prompt the gNB 100 to acquire the UE Capability.

Furthermore, in the present embodiment, as explained above, the acquisition instruction is issued inexplicitly by omitting the respective UE Capability from the Initial Context Setup Request, but messages (or information elements) that explicitly indicate acquisition of UE Capability can also be used.

Further, as explained later, when the gNB 100 also retains (stores) the management table TB, the acquisition instruction transmitting unit 240 can transmit the Initial Context Setup Request (the acquisition instruction) that includes an Acquisition Indicator that indicates that the UE Capability associated with the UE Capability ID has already been retained.

(2.2) gNB 100

Figure 3:
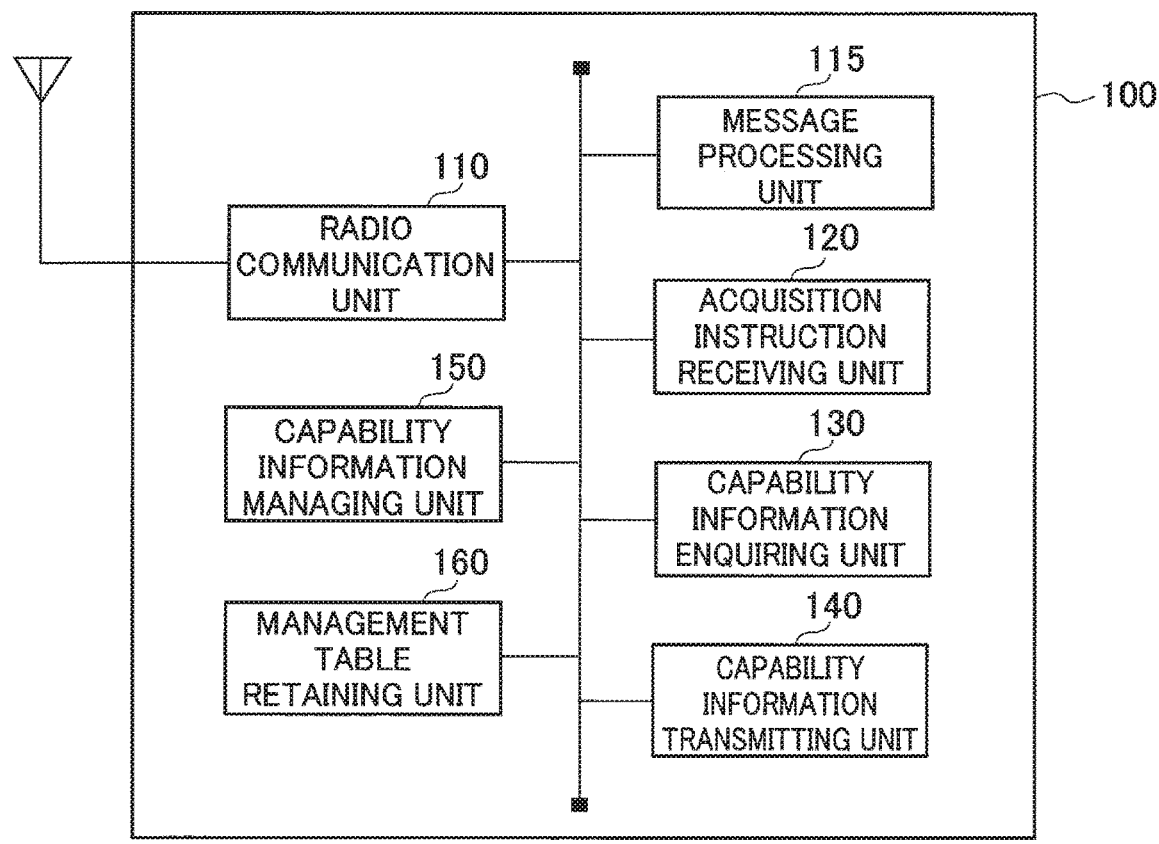
FIG. 3 is a functional block diagram of gNB 100.

FIG. 3 is a functional block diagram of the gNB 100. As shown in FIG. 3, the gNB 100 includes a radio communication unit 110, a message processing unit 115, an acquisition instruction receiving unit 120, a capability information enquiring unit 130, a capability information transmitting unit 140, a capability information managing unit 150, and a management table retaining unit 160.

The radio communication unit 110 performs radio communication using the NR system. Specifically, the radio communication unit 110 transmits to/receives from the UE 50 a radio signal using the NR system. User data or control data are multiplexed in the radio signal. Moreover, the control data is transmitted/received by using a radio resource control layer (RRC layer) message.

The message processing unit 115 performs processing of a message that is transmitted to/received from the UE 50. Moreover, the message processing unit 115 performs processing of a message that is transmitted to/received from the CN 200.

Specifically, the message processing unit 115 transmits/receives the messages of AS (RRC Connection Setup, RRC Connection Setup Complete, and the like) to/from the UE 50. Moreover, the message processing unit 115 transmits to and receives from the CN 200 the S1-AP messages (Initial UE Message, Initial Context Setup Request, and the like).

The acquisition instruction receiving unit 120 receives the UE Capability acquisition instruction from the CN 200. Specifically, the acquisition instruction receiving unit 120 acquires the information element (IE) of the UE Capability that is included in the Initial Context Setup Request.

The capability information enquiring unit 130 transmits based on the acquisition instruction received by the acquisition instruction receiving unit 120, a UE Capability enquiry to the UE 50. Specifically, when the acquisition instruction commands the capability information enquiring unit 130 to acquire the capability information of the UE 50, the capability information enquiring unit 130 transmits to the UE 50 the UE capability enquiry, which is the message of AS.

Moreover, the capability information enquiring unit 130 receives from the UE 50 the UE Capability information, which is a response message to the UE Capability Enquiry. The UE Capability information includes the UE Capability that indicates the capability of the UE 50.

The capability information transmitting unit 140 transmits to the CN 200, the UE Capability received from the UE 50. Specifically, the capability information transmitting unit 140 acquires the UE Capability of the UE 50. The UE Capability is included in the UE Capability information received by the capability information enquiring unit 130. The capability information transmitting unit 140 transmits to the CN 200, the UE Capability Info Indication, which is an S1-AP message that includes the UE Capability.

The capability information managing unit 150 manages the UE Capabilities and the UE Capability IDs by associating them with each other. The functions of the capability information managing unit 150 are substantially the same as that of the capability information managing unit 220 of the CN 200 explained above. In the present embodiment, the capability information managing unit 150 constitutes a capability information managing unit on the base station side.

Furthermore, the capability information managing unit 150, which is generally installed only in the CN 200, can also be installed in the gNB 100 for managing the UE Capabilities and the UE Capability IDs by associating them with each other. In other words, the capability information managing unit 150 is not mandatory.

Specifically, the capability information managing unit 150 manages the UE Capabilities and the associated UE Capability IDs only when the UE 50 is in a Radio Resource Connection (RRC) established state. In other words, when the status of the UE 50 is RRC Idle, the capability information managing unit 150 does not manage the association of UE Capabilities and the UE Capability IDs of the UE 50, and deletes from the management table TB (see FIG. 8) the association of the UE Capabilities with the UE Capability IDs.

The management table retaining unit 160 retains the management table TB, which contains the UE Capability IDs and the UE Capabilities associated with them. The function of the management table retaining unit 160 is substantially the same as that of the management table retaining unit 230 of the CN 200 explained above.

The management table retaining unit 160 modifies the contents of the management table TB based on an instruction from the capability information managing unit 150.

(2.3) UE 50

Figure 4:
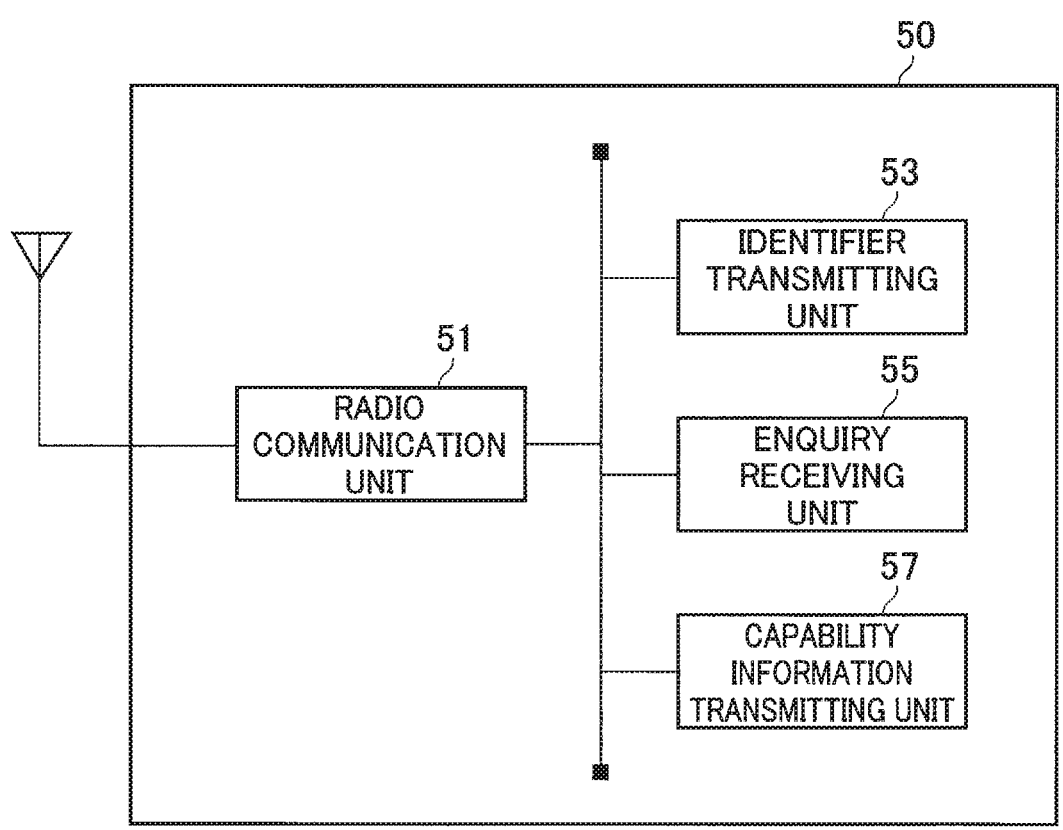
FIG. 4 is a functional block diagram of UE 50.

FIG. 4 is a functional block diagram of the UE 50. As shown in FIG. 4, the UE 50 includes a radio communication unit 51, an identifier transmitting unit 53, an enquiry receiving unit 55, and a capability information transmitting unit 57.

The radio communication unit 51 performs radio communication using the NR system. Specifically, the radio communication unit 51 transmits to/receives from the gNB 100 a radio signal using the NR system. The RRC layer message, user data, and the like are multiplexed in the radio signal.

The identifier transmitting unit 53 transmits the UE Capability ID that identifies the UE Capability of the UE 50. Specifically, the identifier transmitting unit 53 can transmit the UE Capability ID to the gNB 100 by using the NAS message. For example, as explained above, the identifier transmitting unit 53 can transmit the Attach Request that includes the UE Capability ID. Moreover, the identifier transmitting unit 53 can, without limiting to the Attach Request, transmit the UE Capability ID along with the Security Mode Complete or Identity Response based on the request issued using Security Mode Command or Identity Request.

Moreover, the identifier transmitting unit 53 can also transmit the UE Capability ID to the gNB 100 by using the message of AS. Specifically, the identifier transmitting unit 53 can transmit the RRC Connection Setup Complete that includes the UE Capability ID.

The enquiry receiving unit 55 receives an enquiry about the capability information transmitted by the gNB 100 (the capability information enquiring unit 130). Specifically, the enquiry receiving unit 55 receives the UE Capability Enquiry that is transmitted by the gNB 100.

The capability information transmitting unit 57 transmits, based on the enquiry received by the enquiry receiving unit 55, the capability information of the UE 50 to the gNB 100. Specifically, the capability information transmitting unit 57 transmits, based on the UE Capability Enquiry received by the enquiry receiving unit 55, the UE Capability of the UE 50 to the gNB 100.

(3) Operation of Radio Communication System

Operation of the radio communication system 10 is explained below. Specifically, acquisition of the capability information by using the identifier (UE Capability ID) that identifies the capability information (UE Capability) of the UE 50 as well as the registration and update operations of the associations between capabilities and identifiers are explained.

In the present embodiment, the differences in the interfaces (messages) used to acquire the UE Capability ID will be explained in the following three operation examples.

TABLE 1

| Operation Example | Retention in Management Table | Identifier Notification Message |
| --- | --- | --- |
| 1 | CN | NAS |
| 2 | CN | AS |
| 3 | CN, gNB | AS |

(3.1) OPERATION EXAMPLE 1

FIG. 5 shows the acquisition sequence of the UE Capability ID and the update sequence of the management table TB (operation example 1). As shown in FIG. 5, a mandatory sequence is indicated by a solid line, and a non-mandatory, that is, an optional sequence is indicated by a broken line.

The UE 50 transmits to the gNB 100 an RRC Connection Request to establish an RRC connection. The gNB 100 returns to the UE 50 an RRC Connection Setup, which is a response to the RRC Connection Request (Steps 1, 2). Accordingly, settings related to RRC connection are performed.

The UE 50 transmits, upon completion of the settings, the RRC Connection Setup Complete to the gNB 100 (Step 3). The RRC Connection Setup Complete includes an Attach Request, which is a NAS message. The gNB 100 transmits to the CN 200 an Initial UE Message that includes the Attach Request (Step 4). The Attach Request includes the UE Capability ID that identifies the UE Capability of the UE 50.

Moreover, instead of using the Attach Request, the UE 50 can use other NAS messages, specifically, Security Mode Complete or Identity Response, to transmit the UE Capability ID to the CN 200 (Steps 6, 7). More specifically, the CN 200 can request for acquisition of the UE Capability ID by using Security Mode Command or Identity Request, and the UE 50 can transmit Security Mode Complete or Identity Response that includes the UE Capability ID.

The CN 200 acquires the UE Capability ID included in the NAS message and judges whether or not to acquire the UE Capability of the UE 50 (Step 7a).

Specifically, if the UE Capability ID is registered in the management table TB, that is, if the data regarding the association between UE Capability IDs and the UE Capabilities is retained, the CN 200 transmits the Initial Context Setup Request that includes the associated UE Capability (Option (Opt.) UE Capability in the figure) (Step 8). Accordingly, in this case, the CN 200 performs various controls of the UE 50 by using the UE Capability retained in the management table TB.

On the other hand, if the UE Capability ID is not registered in the management table TB, the CN 200 does not include the UE Capability in the Initial Context Setup Request. Accordingly, it is possible to prompt the gNB 100 to acquire the UE Capability.

The gNB 100 judges, based on the UE Capability included in the Initial Context Setup Request, whether or not to acquire the UE Capability of the UE 50 (step 8*a*). Specifically, when the UE Capability is not included in the Initial Context Setup Request, the gNB 100 judges that the UE Capability of the UE 50 be acquired.

In this case, the gNB 100 transmits the UE Capability Enquiry to the UE 50 (Step 9). The UE 50 returns to the gNB 100 the UE Capability information that includes the UE Capability of the UE 50 (Step 10).

The gNB 100 stores the received UE Capability (Step 10*a*). Moreover, when the gNB 100 receives the UE Capability information that includes the UE Capability, it transmits the UE Capability Info Indication to the CN 200 (Step 11). Furthermore, when the UE Capability is included in the Initial Context Setup Request, the gNB 100 does not execute Steps 9 and 11 and stores the UE Capability received at Step 8 (Step 10*a*).

(3.2) OPERATION EXAMPLE 2

FIG. 6 shows the acquisition sequence of the UE Capability ID and the update sequence of the management table TB (operation example 2). A part of the communication sequence that is different from the sequence explained in operation example 1 is mainly explained below, and a part that is similar to the operation example 1 is appropriately omitted.

As shown in Table 1, in the operation example 1, the NAS message is used in the UE Capability ID (identifier) notification, but in the present operation example, the message of AS is used.

As shown in FIG. 6, the UE 50 transmits to the gNB 100 the RRC Connection Setup Complete that includes the UE Capability ID (Step 3). Moreover, the gNB 100 transmits to the CN 200 the Initial UE Message that includes the UE Capability ID (Step 4). That is, the gNB 100 transfers the UE Capability ID included in the RRC Connection Setup Complete to the Initial UE Message.

The sequence from Step 4 onwards is similar to that explained in operation example 1.

(3.3) OPERATION EXAMPLE 3

FIGS. 7A and 7B show the acquisition sequence of the UE Capability ID and the update sequence of the management table TB (operation example 3). A part of the communication sequence that is different from the sequence explained in operation example 1 and 2 is mainly explained below, and a part that is similar to the operation example 1 and 2 is appropriately omitted.

As shown in Table 1, in the operation example 1, the NAS message is used in the UE Capability ID (identifier) notification, but in the present operation example, the message of AS is used. The operation example 2 also uses the same type of message. Furthermore, in the present operation example, both the CN 200 and the gNB 100 retain and update the management table TB.

The gNB 100 acquires the UE Capability ID included in the RRC Connection Setup Complete and judges whether or not to acquire the UE Capability of the UE 50 (Step 3*a*).

Specifically, if the acquired UE Capability ID is registered in the management table TB, that is, if the data regarding the association between UE Capability IDs and the UE Capabilities is retained, the gNB 100 transmits an Initial UE Message that includes an Acquisition Indicator and a UE Capability ID that indicate that the UE Capability associated with the UE Capability ID has already been retained (Step 4). On the other hand, if the UE Capability associated with the UE Capability ID is not retained, the gNB 100 transmits the Initial UE Message that includes only the UE Capability ID and not the Acquisition Indicator.

The CN 200 judges, based on the received UE Capability ID and on the presence or absence of the Acquisition Indicator, whether or not to acquire the UE Capability of the UE 50 (Step 7*a*).

Moreover, the CN 200 determines, based on whether the UE Capability ID is registered in the management table TB and whether the Acquisition Indicator is present, the setting contents of the information element (IE), specifically, Opt. UE Capability and Opt. Indicator, to be included in the Initial Context Setup Request.

FIG. 9 shows the setting logic of the information element (IE) included in the Initial Context Setup Request. As shown in FIG. 9, the Acquisition Indicator (Opt. Indicator) indicates whether or not the UE Capability associated with the UE Capability ID is retained in the management table TB of the CN 200. If the UE Capability is retained, the Acquisition Indicator is set (Yes in the figure) accordingly.

Moreover, as shown in FIG. 9, whether the UE Capability is to be included (Yes in the figure) or not (No in the figure) is set in accordance with whether or not the UE Capability is retained in the management table TB of the gNB 100 and CN 200. Furthermore, in both the operation examples 1 and 2, in the case of pattern 1, specifically, when the UE Capability is already retained in the CN 200, the UE Capability was set to Yes (that is, include UE Capability), but in the present operation example, even in such a case, the UE Capability is set to No. Accordingly, the amount of data signals attributable to the transmission of the UE Capability can be saved. Moreover, because the gNB 100 already has the UE Capability in its management table TB, the CN 200 need not transmit the UE Capability.

Incidentally, considering that the gNB 100 updates the management table TB, the UE Capability can be assumed to be retained in a state shown in pattern 3, but it cannot basically be retained in a state shown in pattern 2 (excluding, however, the cases of failure of the CN 200, and the like).

The CN 200 transmits to the gNB 100 an Initial Context Setup Request that includes the UE Capability and the Acquisition Indicator determined by such setting logic (Step 8).

As shown in FIG. 7B, based on the UE Capability and the Acquisition Indicator that are included in the Initial Context Setup Request, the gNB 100 judges whether or not to acquire the UE Capability of the UE 50 (Step 8*a*).

Specifically, as shown in FIG. 9, the gNB 100 judges, when the UE Capability is set in the Initial Context Setup Request, or when the UE Capability is not set in the Initial Context Setup Request but the Acquisition Indicator is set (Yes), that the UE Capability of the UE 50 not be acquired. On the other hand, when the setting logic of the UE Capability and the Acquisition Indicator is other than the above setting logics, the gNB 100 judges that the UE Capability of the UE 50 be acquired.

The sequence from Step 8*a* onwards is similar to that explained in operation example 2.

Moreover, as explained above, in the present operation example, the UE Capability ID is included in the RRC Connection Setup Complete and the Initial UE Message, and the Acquisition Indicator is included in the Initial UE Message and the Initial Context Setup Request.

(3.4) MODIFICATIONS

Modifications of the operation example 3 are explained below. As explained above, in the operation example 3, both the gNB 100 and the CN 200 retain the management table TB, but the UE Capability managed (stored) by the management table TB can be modified as given below.

Figure 10A:
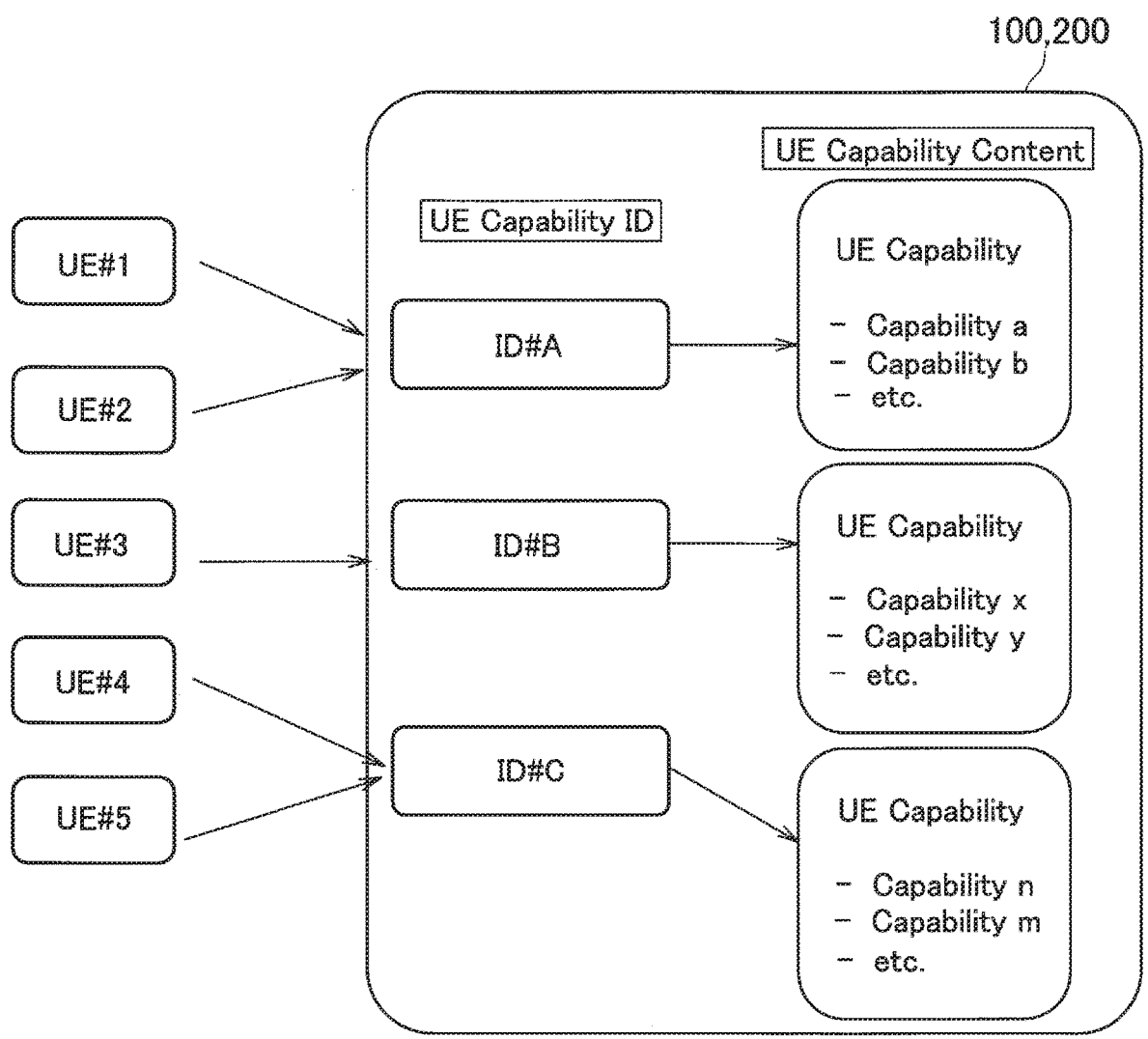
FIG. 10A is a diagram showing an example of a method of managing the UE Capability.

FIGS. 10A and 10B each show an example of the methods of managing the UE Capability. FIG. 10A shows an example in which both the gNB 100 and the CN 200 always manage (store) the UE Capabilities having mutually same contents. On the other hand, FIG. 10B shows an example in which the gNB 100 manages (stores) the UE Capability only when the status of UE is RRC_CONNECTED.

In the example shown in FIG. 10A, regardless of whether the UE is in a connection released state (idle state) or connected state (active state), the data on the association between the UE Capability IDs and the UE Capabilities is always retained in the management table TB.

On the other hand, in the example shown in FIG. 10B, only when the UE is in the connected state (active state), data on the association between the UE Capability IDs and the UE Capabilities is retained in the management table TB, whereas when the UE transits to the connection released state (idle state), such data is deleted.

(4) Effects and Advantages

The following operational effects can be obtained with the embodiments explained above. Specifically, the CN 200 acquires from the UE 50 the UE Capability identifier (UE Capability ID) that indicates the capability of the UE 50, and manages the UE Capabilities and the UE Capability IDs by associating them with each other. Moreover, based on the management conditions, the CN 200 transmits to the gNB 100 the instruction to acquire the UE Capability (Opt. UE Capability of the Initial Context Setup Request).

The gNB 100 acquires the UE Capability of the UE 50 based on the acquisition instructions.

Therefore, the gNB 100 can acquire the UE Capability only if the CN 200 has not retained the UE Capability ID and the associated UE Capability. Accordingly, when using the UE Capability identifier to acquire the UE Capability and send the notification of the UE Capability, it is possible to efficiently acquire the UE Capability and notify the CN 200 of the UE Capability.

Moreover, according to the present embodiment, because it is possible to ease the unnecessary burden of managing duplicate UE Capabilities having mutually same contents, wastage of memory resources of the CN 200 can be prevented. Furthermore, because the number of UE Capability notifications (UE Capability information and UE Capability Info Indication) can be reduced, the amount of data signals attributable to the notifications of the UE Capabilities can also be saved.

In particular, according to the operation example 3 explained above, because the gNB 100 also retains the management table TB, it is possible to ease the unnecessary burden of managing duplicate UE Capabilities having mutually same contents, and to prevent the wastage of memory resources of the gNB 100.

In the present embodiment, the message of NAS or AS can be used to acquire the UE Capability ID and notify the CN 200 of the UE Capability ID. Therefore, it is possible to select the suitable and appropriate mode of notifying and acquiring the UE Capability ID for the implementation of the radio communication system 10, and the like.

In the present embodiment, according to the operation example 3, the gNB 100 manages the UE Capabilities and the UE Capability IDs by associating them with each other only when the UE 50 is in an RRC established (RRC_CONNECTED) state. Therefore, it is possible to prevent the wastage of memory resources of the gNB 100 more effectively.

Moreover, in the present embodiment, according to the operation example 3, the CN 200 can transmit, without setting the UE Capability, the Initial Context Setup Request that includes only the Acquisition Indicator that indicates that the UE Capability associated with the UE Capability ID has already been retained. As a result, the amount of data signals attributable to the notification of the UE Capability can be saved.

(5) Other Embodiments

Although the contents of the present invention have been explained above by using the embodiments, it is obvious for a person skilled in the art that the present invention is not limited to those embodiments and that various modifications and improvements thereof are possible.

For example, in the operation examples 1 to 3 explained above, the optional sequence has also been explained. However, because it is obvious that the sequence is not mandatory, it can be appropriately omitted.

Moreover, the block diagrams used for explaining the embodiments (FIGS. 2 to 4) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 11:
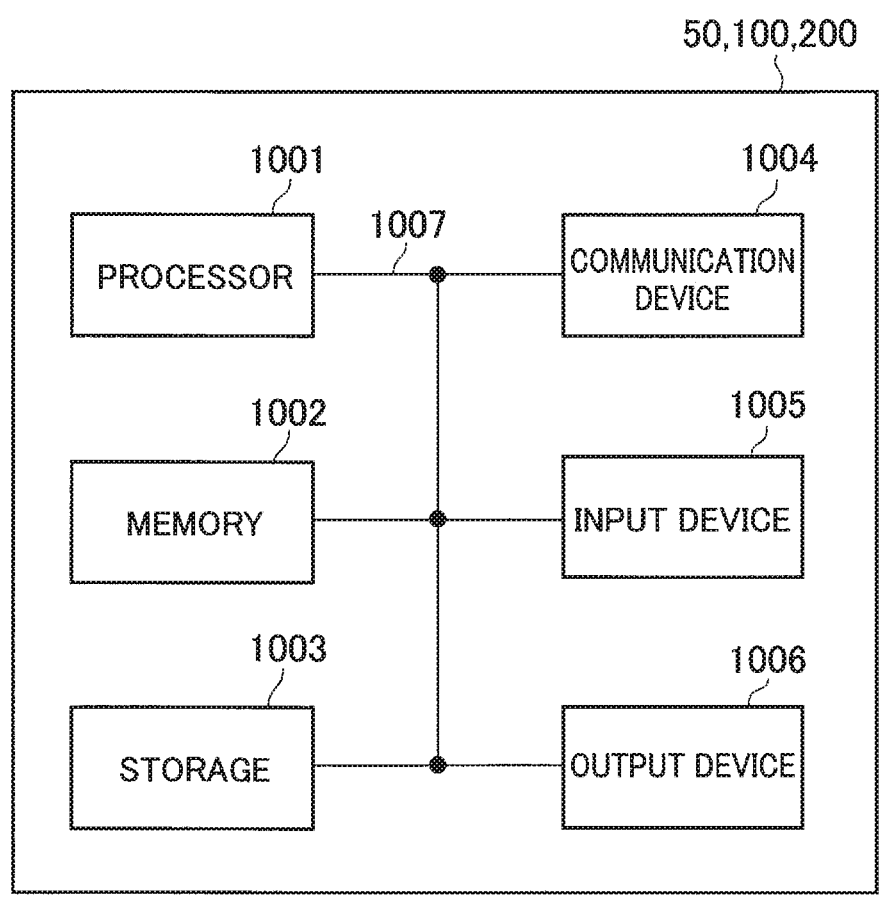
FIG. 11 is a diagram showing an example of hardware configuration of the UE 50, the gNB 100, and the CN 200.

Furthermore, the UE 50, the gNB 100, and the CN 200 (devices) explained above can function as a computer that performs the processing of the present invention. FIG. 11 is a diagram showing an example of a hardware configuration of the devices. As shown in FIG. 11, each of the devices can be configured as a computer device including a processor 1001, a memory 1002, a storage 1003, a communication device 1004, an input device 1005, an output device 1006, and a bus 1007.

The functional blocks of the devices (see FIGS. 2 to 4) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the gNB 100 and the CN 200 can be performed by another network node (device). Moreover, functions of the gNB 100 and the CN 200 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The gNB 100 (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by abase station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The UE 50 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

According to the radio communication system, network device, user device, radio base station and radio communication method explained above, the present invention is useful in that, when using the UE Capability identifier to acquire the UE Capability and send the notification of the UE Capability, it is possible to efficiently acquire the UE Capability and send the notification of the UE Capability.

EXPLANATION OF REFERENCE NUMERALS 10 radio communication system
30 core network

50 UE
51 radio communication unit
53 identifier transmitting unit
55 enquiry receiving unit
57 capability information transmitting unit
100 gNB
110 radio communication unit
115 message processing unit
120 acquisition instruction receiving unit
140 capability information transmitting unit
150 capability information managing unit
160 management table retaining unit
200 CN
210 identifier acquiring unit
220 capability information managing unit
230 management table retaining unit
240 acquisition instruction transmitting unit
TB management table
1001 processor
1002 memory
1003 storage
1004 communication device
1005 input device
1006 output device
1007 bus

The invention claimed is:

1. A radio communication system that includes a network device, a radio base station, and a terminal, wherein
the network device includes
an identifier acquiring unit that acquires from the terminal an identifier of capability information that indicates a capability of the terminal;
a capability information managing unit that manages the capability information and the identifier by associating them with each other; and
an acquisition instruction transmitting unit that transmits, based on the identifier acquired by the identifier acquiring unit, to the radio base station an instruction to acquire the capability information,
the radio base station includes
an acquisition instruction receiving unit that receives the acquisition instruction;
a capability information enquiring unit that transmits, based on the acquisition instruction, to the terminal an enquiry for the capability information; and
a capability information transmitting unit that transmits to the network device the capability information received from the terminal, and
the terminal includes
an identifier transmitting unit that transmits the identifier;
an enquiry receiving unit that receives the enquiry; and
a capability information transmitting unit that transmits to the radio base station the capability information based on the enquiry.

2. The radio communication system as claimed in claim 1, wherein the identifier acquiring unit acquires the identifier that is transmitted from the terminal by using a message of a non-access stratum, which exists between the terminal and the network device.

3. The radio communication system as claimed in claim 1, wherein the radio base station includes a base station side capability information managing unit that manages the capability information, which is acquired from the terminal, and the identifier by associating the capability information and the identifier with each other.

4. The radio communication system as claimed in claim 3, wherein the base station side capability information managing unit manages the capability information and the identifier by associating them with each other only when the terminal is in a connected state in a radio resource control layer.

5. The radio communication system as claimed in claim 3, wherein the acquisition instruction transmitting unit transmits the acquisition instruction that includes an acquisition indicator that indicates that the capability information associated with the identifier has already been retained.

6. A network device comprising:
an identifier acquiring unit that acquires from a terminal an identifier of capability information that indicates a capability of the terminal;
a capability information managing unit that manages the capability information and the identifier by associating them with each other; and
an acquisition instruction transmitting unit that transmits, based on the identifier acquired by the identifier acquiring unit, to a radio base station an instruction to acquire the capability information.

7. A terminal comprising:
an identifier transmitting unit that transmits towards a network device an identifier of capability information that indicates a capability of the terminal;
an enquiry receiving unit that receives an enquiry about the capability information transmitted from a radio base station based on the identifier; and
a capability information transmitting unit that transmits to the radio base station the capability information based on the enquiry.

8. A radio base station comprising:
an acquisition instruction receiving unit that receives an instruction to acquire capability information that indicates a capability of a terminal;
a capability information enquiring unit that transmits to the terminal an enquiry for the capability information, based on the acquisition instruction;
a capability information transmitting unit that transmits to a network device the capability information received from the terminal; and
a base station side capability information managing unit that manages the capability information, which is acquired from the terminal, and an identifier of the capability information by associating the capability information and the identifier with each other.

9. A radio communication method comprising:
transmitting in which a terminal transmits towards a network device an identifier of capability information that indicates a capability of the terminal;
acquiring in which the network device acquires the identifier from the terminal;
transmitting in which the network device transmits, based on the acquired identifier, to a radio base station an instruction to acquire the capability information;
receiving in which the radio base station receives the acquisition instruction;
transmitting in which the radio base station transmits an enquiry about the capability information, based on the acquisition instruction;
receiving in which the terminal receives the enquiry;
transmitting in which the terminal transmits to the radio base station the capability information, based on the enquiry; and transmitting in which the radio base station transmits to the network device the capability information received from the terminal.

\* \* \* \* \*